US012621732B2

(12) United States Patent
Koshimizu et al.

(10) Patent No.: US 12,621,732 B2
(45) Date of Patent: May 5, 2026

(54) USER DEVICE, RADIO COMMUNICATION SYSTEM, AND RADIO COMMUNICATION METHOD

(71) Applicant: NTT DOCOMO, INC., Tokyo (JP)

(72) Inventors: Takashi Koshimizu, Tokyo (JP); Jari Mutikainen, Munich (DE); Riccardo Guerzoni, Munich (DE); Irfan Ali, Istanbul (AR)

(73) Assignee: NTT DOCOMO, INC., Tokyo (JP)

( * ) Notice: Subject to any disclaimer, the term of this patent is extended or adjusted under 35 U.S.C. 154(b) by 76 days.

(21) Appl. No.: 16/622,748

(22) PCT Filed: Jun. 15, 2018

(86) PCT No.: PCT/JP2018/023023
§ 371 (c)(1),
(2) Date: Dec. 13, 2019

(87) PCT Pub. No.: WO2018/230730
PCT Pub. Date: Dec. 20, 2018

(65) Prior Publication Data
US 2020/0112894 A1     Apr. 9, 2020

(30) Foreign Application Priority Data
Jun. 16, 2017     (JP) ................................. 2017-118964

(51) Int. Cl.
*H04W 28/02*          (2009.01)
*H04W 36/00*          (2009.01)
(Continued)

(52) U.S. Cl.
CPC . *H04W 36/00837* (2018.08); *H04W 28/0263* (2013.01); *H04W 36/0022* (2013.01);
(Continued)

(58) Field of Classification Search
None
See application file for complete search history.

(56) References Cited

U.S. PATENT DOCUMENTS 8,374,604 B2 * 2/2013 Cherian .............. H04W 60/005
                                                              455/435.2
8,566,455 B1 * 10/2013 Zhao ..................... H04W 76/10
                                                                709/227
(Continued)

OTHER PUBLICATIONS

U.S. Appl. No. 62/455,696, "Bearer Translation", Larsen et al. p. 1-26 (corresponding to U.S. Appl. No. 62/455,696-A1), dated Jul. 2, 2017.*
(Continued)

*Primary Examiner* — Gregory B Sefcheck
(74) *Attorney, Agent, or Firm* — Osha Bergman Watanabe & Burton LLP

(57)          ABSTRACT

User equipment (UE) includes a mapping information holding unit that holds association information in which are associated with each other a type of an EPS bearer set in 4G and a type of a QoS flow set in 5G and that depends on a quality of service, a filter holding unit that holds a filter of a traffic flow associated with the EPS bearer set for the UE in the 4G, and a QoS rule generating unit that generates, based on EPS Bearer ID for recognizing the type of the EPS bearer and the filter held by the filter holding unit, 5G QoS Rule associated with the QoS flow.

2 Claims, 9 Drawing Sheets

(51) Int. Cl.
  *H04W 36/14* (2009.01)
  *H04W 36/22* (2009.01)
  *H04W 36/30* (2009.01)
(52) U.S. Cl.
  CPC ....... *H04W 36/1443* (2023.05); *H04W 36/22* (2013.01); *H04W 36/304* (2023.05)

(56) References Cited

U.S. PATENT DOCUMENTS

| | | | | |
|---|---|---|---|---|
| 9,179,363 | B2 * | 11/2015 | Siomina | H04W 28/08 |
| 9,277,579 | B1 * | 3/2016 | Zhao | H04W 76/15 |
| 9,386,506 | B2 * | 7/2016 | Kim | H04L 12/1457 |
| 9,713,059 | B2 * | 7/2017 | Cuevas Ramirez | H04W 36/30 |
| 9,813,970 | B2 * | 11/2017 | Madan | H04W 36/22 |
| 9,844,082 | B1 * | 12/2017 | Zhao | H04W 36/0016 |
| 10,085,201 | B2 * | 9/2018 | Ryu | H04W 36/0055 |
| 10,313,937 | B2 * | 6/2019 | Da Silva | H04W 36/0083 |
| 10,341,898 | B2 * | 7/2019 | Mehta | H04W 92/045 |
| 10,568,007 | B2 * | 2/2020 | Park | H04W 36/30 |
| 10,609,556 | B2 * | 3/2020 | Ben Henda | H04L 63/0892 |
| 10,678,602 | B2 * | 6/2020 | Manglik | G06F 8/61 |
| 10,701,743 | B2 * | 6/2020 | Shan | H04W 76/12 |
| 10,848,497 | B2 * | 11/2020 | Castellanos Zamora | H04W 12/088 |
| 10,972,934 | B2 * | 4/2021 | Mehta | H04W 28/0268 |
| 11,032,432 | B2 * | 6/2021 | Shen | H04W 76/16 |
| 11,153,788 | B2 * | 10/2021 | Park | H04W 8/08 |
| 2003/0037052 | A1 * | 2/2003 | Kitain | G06F 16/10 |
| 2008/0019275 | A1 * | 1/2008 | Mudireddy | H04L 47/20 370/235 |
| 2008/0089228 | A1 * | 4/2008 | Lin | H04L 47/10 370/310 |
| 2010/0284278 | A1 * | 11/2010 | Alanara | H04L 47/263 370/235 |
| 2011/0305137 | A1 * | 12/2011 | Chu | H04W 76/36 370/230 |
| 2012/0122448 | A1 * | 5/2012 | Mueck | H04W 28/24 455/424 |
| 2013/0143574 | A1 * | 6/2013 | Teyeb | H04W 72/044 455/438 |
| 2013/0195075 | A1 * | 8/2013 | Keller | H04W 36/0022 370/331 |
| 2013/0301609 | A1 * | 11/2013 | Smith | H04W 16/14 370/329 |
| 2014/0078898 | A1 * | 3/2014 | Anchan | H04W 36/0066 370/230 |
| 2014/0198637 | A1 * | 7/2014 | Shan | H04W 52/244 370/229 |
| 2014/0328318 | A1 * | 11/2014 | Sundararajan | H04W 40/248 370/331 |
| 2014/0329526 | A1 * | 11/2014 | Sundararajan | H04W 36/144 455/436 |
| 2014/0355428 | A1 * | 12/2014 | Smith | H04W 28/023 370/230 |
| 2015/0009826 | A1 * | 1/2015 | Ma | H04W 28/0263 370/235 |
| 2015/0098323 | A1 * | 4/2015 | Lim | H04W 28/0268 370/230 |
| 2016/0112896 | A1 * | 4/2016 | Karampatsis | H04W 28/0252 370/230.1 |
| 2016/0183156 | A1 * | 6/2016 | Chin | H04L 61/2007 370/331 |
| 2016/0381491 | A1 * | 12/2016 | Watfa | H04W 72/04 455/41.2 |
| 2017/0019819 | A1 * | 1/2017 | Yang | H04W 36/0072 |
| 2017/0086090 | A1 * | 3/2017 | Sharma | H04L 65/403 |
| 2017/0127331 | A1 * | 5/2017 | Wu | H04W 76/27 |
| 2017/0257907 | A1 * | 9/2017 | Yu | H04W 36/00837 |
| 2017/0347307 | A1 * | 11/2017 | Mehta | H04W 76/15 |
| 2018/0092142 | A1 * | 3/2018 | Han | H04W 76/12 |
| 2018/0183724 | A1 * | 6/2018 | Callard | H04L 41/0806 |
| 2018/0242205 | A1 * | 8/2018 | Mildh | H04W 36/0016 |
| 2018/0324631 | A1 * | 11/2018 | Jheng | H04W 28/0268 |
| 2018/0359672 | A1 * | 12/2018 | Keller | H04W 36/14 |
| 2019/0150219 | A1 * | 5/2019 | Wang | H04W 76/30 370/329 |
| 2019/0150225 | A1 * | 5/2019 | Mohamed | H04W 76/12 370/329 |
| 2019/0260669 | A1 * | 8/2019 | Zhu | H04W 28/0252 |
| 2019/0261211 | A1 * | 8/2019 | Wu | H04W 48/18 |
| 2019/0289506 | A1 * | 9/2019 | Park | H04W 36/0044 |
| 2019/0364541 | A1 * | 11/2019 | Ryu | H04W 80/10 |
| 2019/0394631 | A1 * | 12/2019 | Stojanovski | H04W 8/04 |
| 2020/0037207 | A1 * | 1/2020 | Centonza | H04W 36/0022 |
| 2020/0178112 | A1 * | 6/2020 | Youn | H04W 28/0268 |
| 2020/0267617 | A1 * | 8/2020 | Larsen | H04W 36/30 |
| 2020/0267753 | A1 * | 8/2020 | Adjakple | H04W 72/1226 |
| 2021/0306900 | A1 * | 9/2021 | Mehta | H04L 47/18 |
| 2022/0255867 | A1 * | 8/2022 | Arrobo Vidal | H04L 69/22 |
| 2022/0360608 | A1 * | 11/2022 | Raleigh | H04W 12/08 |

OTHER PUBLICATIONS

U.S. Appl. No. 62/501,917, filed May 5, 2017, Jheng et al., "Handling of Reflective Mapping in Mobile Communication System", p. 1-6.*
Extended European Search Report issued in counterpart European Patent Application No. 18818010.3, mailed on May 15, 2020 (9 pages).
Huawei, HiSilicon, Samsung; "TS23.501 Reflective QoS deactivation"; SA WG2 Meeting #120, S2-172371; Busan, Korea; Mar. 27-31, 2017 (3 pages).
International Search Report issued in PCT/JP2018/023023 mailed on Sep. 4, 2018 (1 page).
Written Opinion of the International Searching Authority issued in in PCT/JP2018/023023 mailed on Sep. 4, 2018 (3 pages).
NTT DOCOMO; "Single Registration-based handover from EPS to 5GS procedure"; SA WG2 Meeting #121, S2-173317; Hangzhou, China; May 15-19, 2017 (5 pages).
NTT DOCOMO; "Considerations about session parameters mapping from EPS to 5GS"; SA WG2 Meeting #121, S2-173316; Hangzhou, China; May 15-19, 2017 (4 pages).
ZTE; "Discussion and proposal on the mapping for the 4G to 5G handover"; SA WG2 Meeting #122, S2-174177; Cabo, Mexico; Jun. 26-30, 2017 (7 pages).
Intel; "Solution for mobility in the EPC=>5GC direction"; 3GPP TSG SA WG2 Meeting #121, S2-173522; Hangzhou, P. R. China; May 15-19, 2017 (4 pages).
Office Action in counterpart Chinese Patent Application No. 201880039007.0 issued on Apr. 6, 2021 (13 pages).
NTT DOCOMO; "TS 23.502: Registration procedure changes for EPS to NGS idle mode mobility with Nx interface"; SA WG2 Meeting #120, S2-173318; Hangzhou, China; May 15-19, 2017 (9 pages).
Huawei et al.; "Handover procedure from 4G to 5G in Single Registration mode"; SA WG2 Meeting #121, S2-173946; Hangzhou, China; May 15-19, 2017 (8 pages).
Office Action in counterpart Chinese Patent Application No. 201880039007.0 issued on Nov. 8, 2021 (10 pages).
Office Action in counterpart European Patent Application No. 18818010.3 issued on Nov. 5, 2021 (6 pages).
Office Action in counterpart Chinese Patent Application No. 201880039007.0 issued on Jun. 16, 2022 (10 pages).
Office Action in counterpart European Patent Application No. 18818010.3 issued on Jan. 17, 2023 (6 pages).

* cited by examiner

FIG. 9

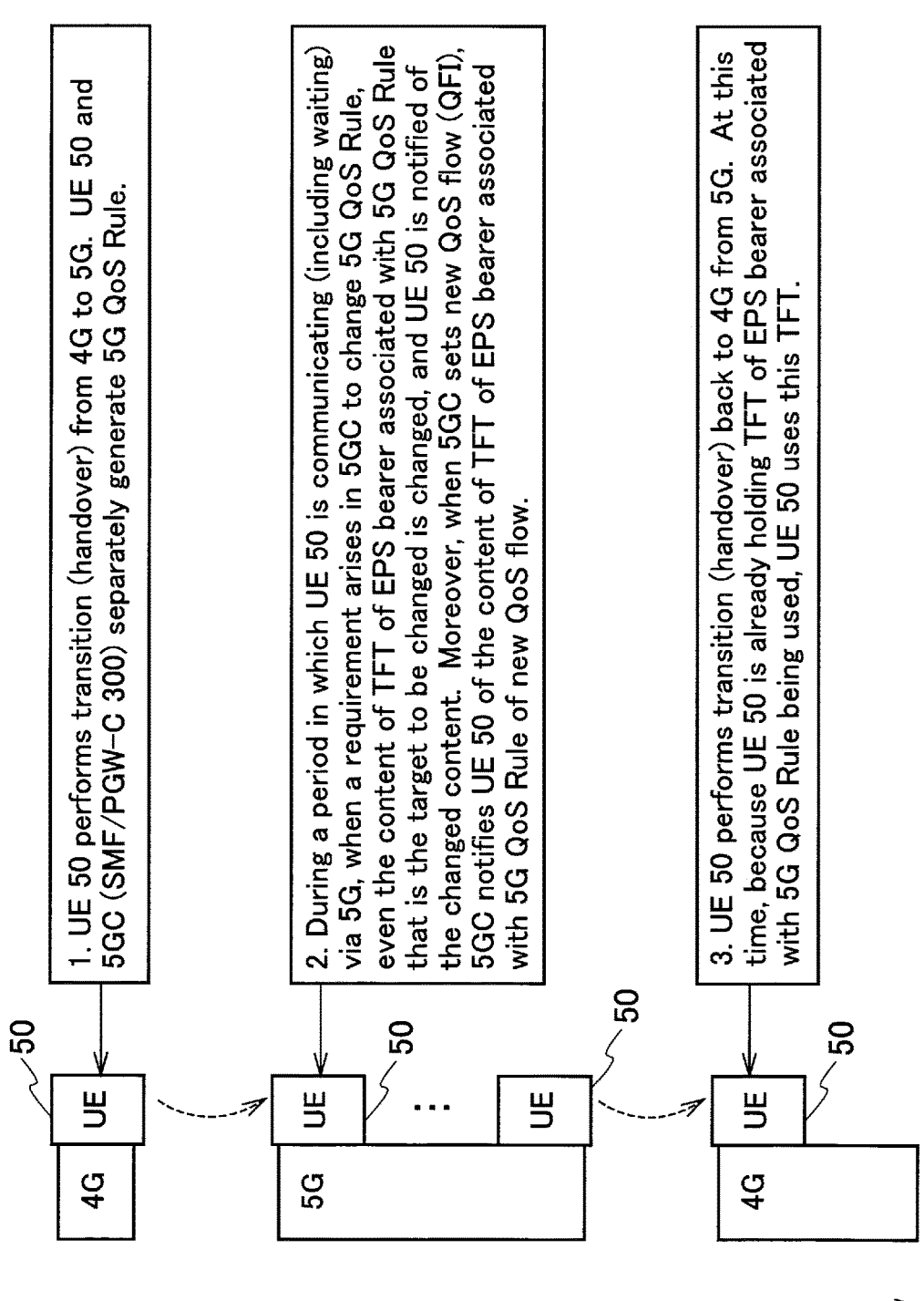

1. UE 50 performs transition (handover) from 4G to 5G. UE 50 and 5GC (SMF/PGW-C 300) separately generate 5G QoS Rule.

2. During a period in which UE 50 is communicating (including waiting) via 5G, when a requirement arises in 5GC to change 5G QoS Rule, even the content of TFT of EPS bearer associated with 5G QoS Rule that is the target to be changed is changed, and UE 50 is notified of the changed content. Moreover, when 5GC sets new QoS flow (QFI), 5GC notifies UE 50 of the content of TFT of EPS bearer associated with 5G QoS Rule of new QoS flow.

3. UE 50 performs transition (handover) back to 4G from 5G. At this time, because UE 50 is already holding TFT of EPS bearer associated with 5G QoS Rule being used, UE 50 uses this TFT.

USER DEVICE, RADIO COMMUNICATION SYSTEM, AND RADIO COMMUNICATION METHOD

TECHNICAL FIELD

The present invention relates to a user device, a radio communication system, and a radio communication method capable of performing inter-system handover.

BACKGROUND ART

3rd Generation Partnership Project (3GPP) specifies Long Term Evolution (LTE), and with an aim of further speeding, specifies LTE-Advanced (hereinafter, it is assumed that 4G includes the LTE-Advanced). Moreover, in the 3GPP, specifications of a successor system of the LTE (hereinafter, referred to as 5G) called 5G New Radio (NR) and the like are being studied.

The specifications of such 5G also include inter-work between 4G and 5G, for example, handover of a user device (User Equipment, UE) between 4G and 5G. In the inter-system handover between 4G (specifically Evolved Packet Core (EPC)) and 5G (specifically 5G Core (5GC)), a mapping between PDN connection set in the EPC and PDU session set in the 5GC is necessary.

Specifically, a mapping between an EPS bearer related to the PDN connection and a QoS flow related to the PDU session is necessary.

Moreover, when the UE performs handover from 4G to 5G, it is necessary that the content of a traffic flow template (TFT), which is a list of filters of a traffic flow (IP flow) associated with the EPS bearer, is reflected in a QoS rule associated with the QoS flow of the handover destination. That is, it is necessary that the UE and EPC-5GC recognize filtering content of similar traffic flow before and after the handover.

Therefore, when the UE performs handover from 4G to 5G, a method of associating, regardless of the content of the TFT associated with the EPS bearer, a default QoS rule with the QoS flow of the handover destination has been proposed (see Non-Patent Document 1). With this method, when executing the handover, it is not necessary to exchange information between the UE and the EPC-5GC. Therefore, the handover procedure from 4G to 5G can be simplified. Furthermore, because the handover processing load is reduced, this may lead to reduction in delay.

PRIOR ART DOCUMENT

Non-Patent Document

Non-Patent Document 1: "Solution for mobility in the EPC=>5GC direction", S2-173522, 3GPP TSG SA WG2 Meeting #121, 3GPP, May 2017

SUMMARY OF THE INVENTION

The method described in Non-Patent Document 1 considers a case in which a particular TFT is not associated with the EPS bearer (that is, a case in which a so-called "match all" filter is associated).

However, for example, there are situations, like in Voice over LTE (VoLTE), in which a particular TFT is associated with the EPS bearer. In such situations, if the method of associating the default QoS rule with the QoS flow of the handover destination described above is used, similar quality of service (QoS) cannot be provided to a traffic flow of the VoLTE after completion of the handover to 5G.

The present invention has been made in view of the above discussion. One object of the present invention is to provide a user device, a radio communication system, and a radio communication method that can autonomously reflect the content of the TFT in the QoS rule associated with the QoS flow of the handover destination even when the particular traffic flow template (TFT) is associated with the EPS bearer.

A user device according to one aspect of the present invention is a user device (UE 50) that performs handover between a first radio communication system (4G) and a second radio communication system (5G). The user device includes an association information holding unit (mapping information holding unit 56) that holds association information indicative of an association between a type of a bearer (EPS bearer) set in the first radio communication system and a type of a flow (QoS flow) that is set in the second radio communication system and that depends on a quality of service; a filter holding unit (filter holding unit 57) that holds a filter (TFT) of a traffic flow associated with the bearer set for the user device in the first radio communication system; and a rule generating unit (QoS rule generating unit 58) that generates, based on a bearer identifier (EPS Bearer ID) for recognizing the type of the bearer and the filter held by the filter holding unit, a quality-of-service rule (5G QoS Rule) associated with the flow.

A radio communication system according to another aspect of the present invention is a radio communication system including a first radio communication system and a second radio communication system. The radio communication system includes an association information holding unit (mapping information holding unit 330) that holds association information indicative of association between a type of a bearer set in the first radio communication system and a type of a flow that is set in the second radio communication system and that depends on a quality of service; a filter acquiring unit (filter acquiring unit 350) that acquires a filter of a traffic flow associated with the bearer set for a user device in the first radio communication system; and a rule generating unit (QoS rule generating unit 360) that generates, based on a bearer identifier for recognizing the type of the bearer and the filter acquired by the filter acquiring unit, a quality-of-service rule associated with the flow.

A radio communication method according to still another aspect of the present invention is a radio communication method implemented in a user device that performs handover between a first radio communication system and a second radio communication system. The radio communication method includes holding in which a user device holds association information indicative of an association between a type of a bearer set in the first radio communication system and a type of a flow that is set in the second radio communication system and that depends on a quality of service, and a filter of a traffic flow associated with the bearer set for the user device in the first radio communication system; and generating in which the user device generates, based on a bearer identifier for recognizing the type of the bearer and the held filter, a quality-of-service rule associated with the flow.

BRIEF DESCRIPTION OF DRAWINGS

FIG. 9 is a view for explaining setting of the QoS rule and the TFT when the UE 50 performs 4G-5G-4G handover.

MODES FOR CARRYING OUT THE INVENTION

Figure 1:
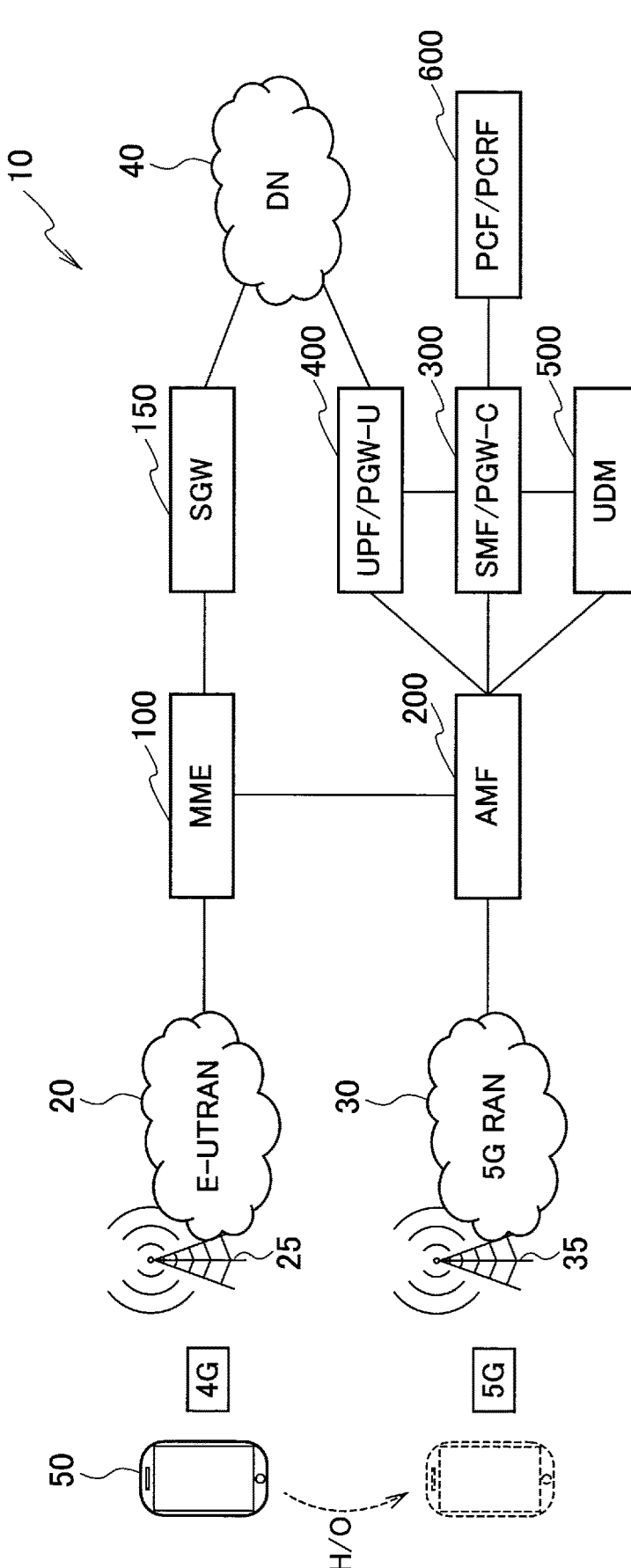
FIG. 1 is an overall structural diagram of a radio communication system 10.

Exemplary embodiments of the present invention are explained below with reference to the accompanying drawings. In the drawings, structural elements having the same function or configuration are indicated by the same or similar reference numerals and the explanation thereof is appropriately omitted.

(1) Overall Structural Configuration of Radio Communication System

FIG. 1 is an overall structural diagram of a radio communication system 10 according to the present embodiment. The radio communication system 10 supports a plurality of radio communication schemes. Specifically, the radio communication system 10 is constituted by a plurality of the radio communication systems that varies in the radio communication schemes.

More specifically, as shown in FIG. 1, the radio communication system 10 is constituted by a radio communication system in accordance with 4G (first radio communication system) and a radio communication system in accordance with 5G (second radio communication system).

The "4G" is a radio communication system in accordance with Long Term Evolution (LTE), and includes an Evolved Universal Terrestrial Radio Access Network 20 (hereinafter, "E-UTRAN 20"), a Mobility Management Entity 100 (hereinafter, "MME 100"), a Serving Gateway 150 (hereinafter, "SGW 150"), and the like.

The "5G" is a successor system of the LTE called New Radio (NR) and the like, and includes a 5G Radio Access Network 30 (hereinafter, "5G RAN 30"), an Access and Mobility Management Function 200 (hereinafter, "AMF 200"), a Session Management Function/PDN Gateway-C plane 300 (hereinafter, "SMF/PGW-C 300"), a User Plane Function 400 (hereinafter, "UPF/PGW-U 400"), a Unified Data Management 500 (hereinafter, "UDM 500"), a Policy Control Function/Policy and Charging Rules Function 600 (hereinafter, "PCF/PCRF 600"), and the like. The configuration of nodes that constitute the 5G shown in FIG. 1 is in accordance with the standards stipulated in 3GPP TS 23.501 and the like.

A Data Network 40 (hereinafter, "DN 40") is connected to the SGW 150 and the UPF/PGW-U 400. An IP network such as the Internet is connected to the DN 40.

In FIG. 1, however, only the nodes (devices) relating to the present invention are shown. As it can be clearly understood from the names, the SMF/PGW-C 300, the UPF/PGW-U 400, and the PCF/PCRF 600 are explained so because it is assumed that the 4G functions (PGW-C, PGW-U, PCRF), too, would expand in the future and develop so as to function as the 5G.

Moreover, the "4G" can be referred to as the LTE (including LTE-Advanced), and the "5G" can be referred to as the New Radio (NR) and the like. Furthermore, a node group at the 4G core network side excluding the E-UTRAN 20 can be referred to as the Evolved Packet Core (EPC). A node group at the 5G core network side excluding the 5G RAN 30 can be referred to as the 5G Core (5GC).

The E-UTRAN 20 includes a radio base station 25. The radio base station 25 can be referred to as eNB (eNode B). The 5G RAN 30 includes a radio base station 35. The radio base station 35 can be referred to as gNB (gNode B).

A user device 50 (hereinafter, "UE 50") supports the 4G and the 5G. In other words, the UE 50 executes radio communication in accordance with the 4G with the radio base station 25, and executes radio communication in accordance with the 5G with the radio base station 35.

Moreover, the UE 50 performs handover between 4G (first radio communication system) and 5G (second radio communication system). In other words, the UE 50 can perform handover from 4G to 5G and from 5G to 4G.

Particularly, in the present embodiment, as explained later, the UE 50, the EPC, and the 5GC acquire association between the EPS bearer and the QoS flow by using mapping information in which a flow identifier (QoS Flow ID) for recognizing a type of the QoS flow set in the 5G and a bearer identifier (EPS Bearer ID) for recognizing a type of the EPS bearer set in the 4G are associated. Handover is performed between the bearer and the QoS flow that are associated with each other.

Note that, the EPS Bearer ID may be abbreviated to EBI, and the QoS Flow ID may be abbreviated to QFI.

(2) Functional Block Configuration of Radio Communication System

A functional block configuration of the radio communication system 10 is explained below. Specifically, a functional block configuration of the UE 50 and the SMF/PGW-C 300 is explained below.

(2.1) UE 50

Figure 2:
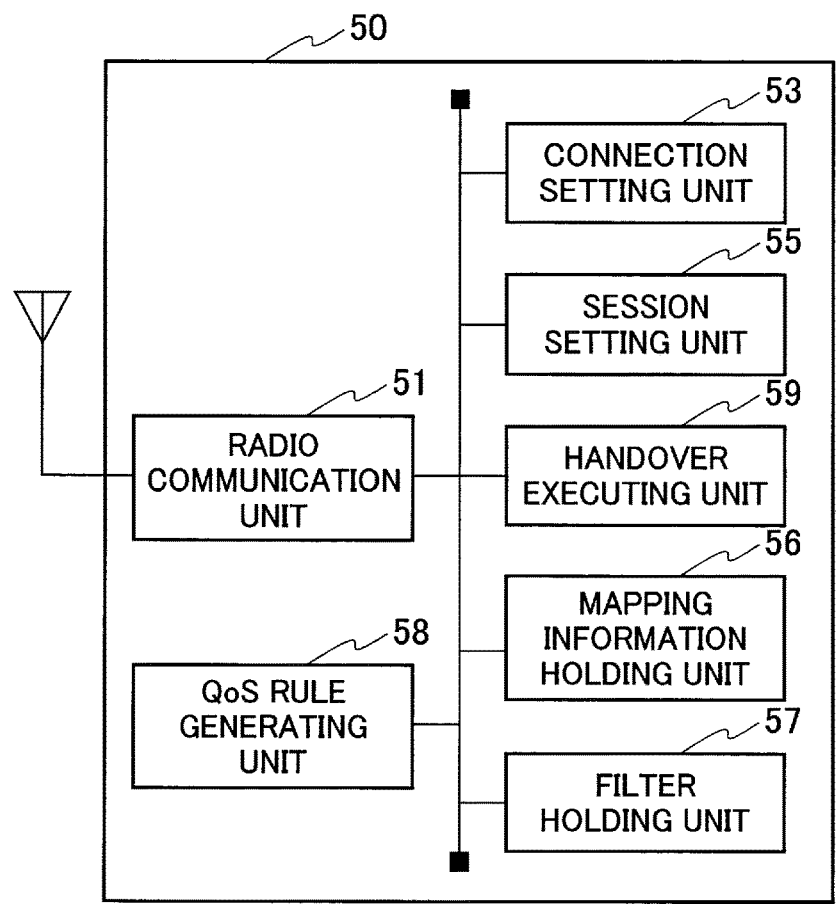
FIG. 2 is a functional block diagram of UE 50.

FIG. 2 is a functional block diagram of the UE 50. As shown in FIG. 2, the UE 50 includes a radio communication unit 51, a connection setting unit 53, a session setting unit 55, a mapping information holding unit 56, a filter holding unit 57, a QoS rule generating unit 58, and a handover executing unit 59.

The radio communication unit 51 performs radio communication in accordance with the 4G and the 5G. Specifically, the radio communication unit 51 transmits and receives radio signals to and from the radio base station 25 in accordance with the 4G. Moreover, the radio communication unit 51 transmits and receives radio signals to and from the radio base station 35 in accordance with the 5G.

Note that, in the present embodiment, the type of the UE 50 is not particularly limited. That is, the UE 50 can belong to the ordinary UE category, or can belong to a category for Internet of Things (IoT), specifically a category (category M1, M2) for bandwidth reduced low complexity UE (BL UE).

Furthermore, the UE 50 may be able to perform carrier aggregation (CA) and dual connectivity (DC).

The connection setting unit 53 sets Packet Data Network connection (PDN connection) with the EPC. Specifically, the connection setting unit 53 sets the PDN connection that goes via the EPS bearer that is a logical communication path set with the EPC. That is, the PDN connection is related (is associated) to the EPS bearer.

The session setting unit 55 sets Protocol Data Unit session (PDU session) with the 5GC. Specifically, the session setting unit 55 sets the PDU session that shows a connection relation (association) between the UE 50 and the DN 40 that provides PDN Connectivity service.

Moreover, the PDU session is related (is associated) to the QoS flow (5G QoS Flow) prescribed in the 5GC. The QoS flow corresponds with a particular quality of service (QoS). A communication (traffic) assigned to the QoS flow receives the same handling with respect to scheduling, queue management, shaping, configuration of the radio link control layer (RLC), and the like of.

The mapping information holding unit 56 holds mapping information (association information) in which the type of the EPS bearer and the type of the QoS flow (5G QoS Flow) are mapped with each other. As mentioned earlier, the EPS bearer is set in the 4G. Moreover, the QoS flow is set in the 5G, and it is prescribed depending on the particular quality of service.

The mapping information is necessary when the UE 50 performs handover (inter-system handover) between 4G and 5G. That is, the mapping between the EPS bearer related to the PDN connection and the QoS flow related to the PDU session becomes necessary when the UE 50 performs the inter-system handover.

The mapping information held in the mapping information holding unit 56 includes such association between the EPS Bearer ID and the QoS Flow ID. That is, the EPS Bearer ID for recognizing the type of the EPS bearer and the QoS Flow ID for recognizing the type of the QoS flow are mapped with each other in the mapping information. Note that, a detailed explanation about the mapping information is given below with reference to FIGS. 5 and 6.

The mapping information holding unit 56 can hold the mapping information received from the EPC or the 5GC. For example, the mapping information can be transmitted to the UE as a message, notification information (SIB (System Information Block)), and the like of the radio resource control layer (RRC layer).

Alternatively, the mapping information can be stored beforehand in Universal Integrated Circuit Card (UICC), Universal Subscriber Identity Module (USIM), and the like of the UE 50. Furthermore, the mapping information can be updated together when firmware is updated by FOTA (Firmware On-The-Air). Alternatively, the mapping information can be updated together when the operating system of the UE 50 is updated.

The filter holding unit 57 holds a filter of the traffic flow (IP flow) associated with the EPS bearer. Specifically, the filter holding unit 57 holds a traffic flow template (TFT) associated with the EPS bearer set for the UE 50 in the 4G.

The TFT includes Filter id (filter identifier), Precedence order (precedence), and Filter Content (filter content). The TFT may be called a filter list and the like. More information about the TFT will be given later.

The QoS rule generating unit 58 generates a quality-of-service rule associated with the QoS flow. Specifically, the QoS rule generating unit 58 autonomously generates 5G QoS Rule associated with the QoS flow.

More specifically, the QoS rule generating unit 58 generates the 5G QoS Rule associated with a particular QoS flow (5G QoS Flow) based on the EBI (bearer identifier) for recognizing the type of the EPS bearer and the filter (TFT) held by the filter holding unit 57.

As mentioned earlier, because the association between the EPS bearer and the QoS flow can be identified based on the mapping information held in the mapping information holding unit 56, the QoS rule generating unit 58 can derive the 5G QoS Rule associated with the EPS bearer set by the UE 50 and generate the QoS flow.

A timing at which the QoS rule generating unit 58 generates the 5G QoS Rule is not particularly limited. For example, the QoS rule generating unit 58 can generate the 5G QoS Rule when the handover of the UE 50 is performed by the handover executing unit 59.

Specifically, as explained below, the QoS rule generating unit 58 can generate the 5G QoS Rule at a timing (see FIG. 4) when the UE 50 sets the radio bearer with the 5G RAN 30, a timing (see FIG. 8) at which the UE 50 transmits Handover Complete.

Moreover, the QoS rule generating unit 58 can generate Rule id (rule identifier) for recognizing the 5G QoS Rule based on the EBI and the Filter id (filter identifier) for recognizing the filter (TFT). A specific method for generating the 5G QoS Rule including the Rule id will be explained later.

The handover executing unit 59 performs intra-system handover of the UE 50 and the inter-system handover of the UE 50. That is, the handover executing unit 59 performs the handover from 4G to 5G and the handover from 5G to 4G.

Particularly, in the present embodiment, the handover executing unit 59 performs the inter-system handover between 4G and 5G by using the mapping information held by the mapping information holding unit 56.

When the UE 50 performs the inter-system handover between 4G and 5G, the handover executing unit 59 acquires, by using the mapping information, the association between the EPS bearer set by the UE 50 and the QoS flow set by the UE 50. Furthermore, the handover executing unit 59 performs, based on the acquired association, the handover between the mutually associated EPS bearer and the QoS flow.

Specifically, the handover executing unit 59 performs the handover in accordance with interworking procedures prescribed in 3GPP TS 23.502 Section 4.11 (System interworking procedures with EPS).

Moreover, after performing the handover, that is, after performing the inter-system handover between 4G and 5G, until the QoS flow set with the 5GC is released (that is, including making handover back to 4G), the handover executing unit 59 can hold the acquired association between the EPS bearer and the QoS flow and the 5G QoS Rule generated based on the EBI and the filter (TFT).

Furthermore, even the SMF/PGW-C 300 can hold this association (and the 5G QoS Rule) until the QoS flow is released. Accordingly, the UE 50 and the SMF/PGW-C 300 can readily refer to this acquired association between the EPS bearer and the QoS flow when the need arises.

(2.2) SMF/PGW-C 300

Figure 3:
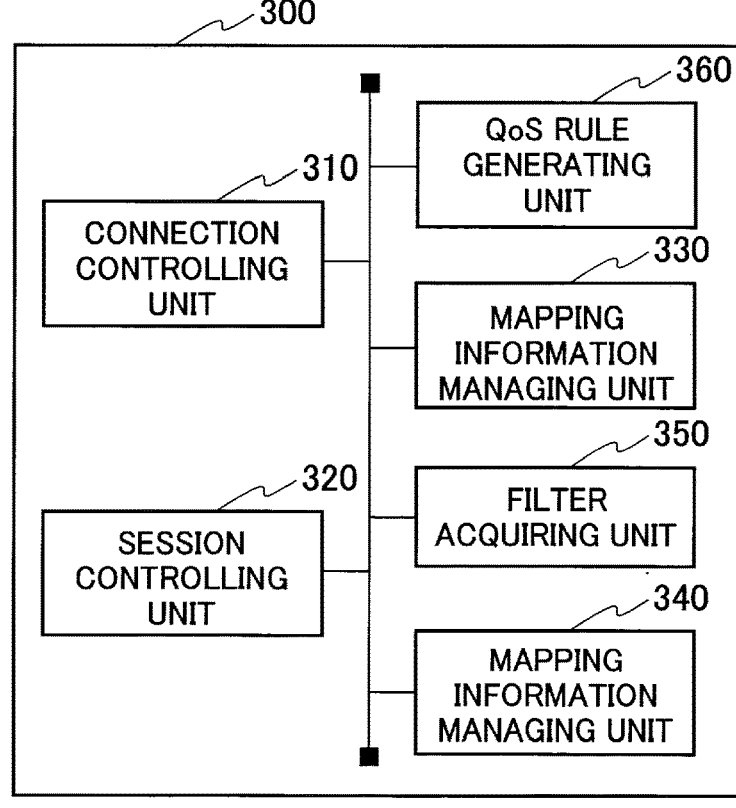
FIG. 3 is a functional block diagram of SMF/PGW-C 300.

FIG. 3 is a functional block diagram of the SMF/PGW-C 300. As shown in FIG. 3, the SMF/PGW-C 300 includes a connection controlling unit 310, a session controlling unit 320, a mapping information holding unit 330, a mapping information managing unit 340, a filter acquiring unit 350, and a QoS rule generating unit 360.

The connection controlling unit 310 performs a control of the PDN connection set with the UE 50. Specifically, the connection controlling unit 310 performs setting, release-ment, and the like of the PDN connection while cooperating with other nodes (MME 100, AMF 200, and the like) that constitute the EPC or the 5GC.

The session controlling unit 320 performs a control of the PDU session set with the UE 50. Specifically, the session controlling unit 320 performs setting, releasement, and the like of the PDU session while cooperating with other nodes (AMF 200 and the like) that constitute the EPC or the 5GC.

The mapping information holding unit 330 holds the same mapping information (association information) as the map-ping information held by the UE 50. That is, the mapping information holding unit 330 holds the mapping information in which the type of the EPS bearer and the type of the QoS flow are mapped with each other.

Moreover, the mapping information holding unit 330 can hold the mapping information generated or updated by the mapping information managing unit 340.

The mapping information managing unit 340 manages the mapping information (association information) in which the type of the EPS bearer and the type of the QoS flow are mapped with each other. Specifically, the mapping informa-tion managing unit 340 generates the mapping information based on information supplied by other nodes that constitute the EPC or the 5GC. Note that, the content of the specific mapping may be specified by an operator of the radio communication system 10, or the content may be generated automatically based on a predetermined algorithm.

The mapping information managing unit 340 can cause the mapping information holding unit 330 to hold the generated mapping information and can transmit the same to the UE 50. As mentioned earlier, the mapping information can be transmitted to the UE 50 in the form of the message, the notification information, and the like of the RRC layer.

The mapping information managing unit 340 can update the content of the mapping information based on the infor-mation supplied by other nodes that constitute the EPC or the 5GC. The mapping information managing unit 340 causes the mapping information holding unit 330 to hold the updated mapping information.

The filter acquiring unit 350 acquires the filter (TFT) of the traffic flow (IP flow) associated with the EPS bearer. Specifically, the filter acquiring unit 350 acquires the TFT associated with the EPS bearer set for the UE 50 in the 4G.

More specifically, the filter acquiring unit 350 acquires content (Filter id, Precedence order, and Filter Content) of the TFT by using a session administration function provided in SMF and PGW-C. The SMF and the PGW-C hold information about the EPS bearer of the 4G by virtue of the session administration function, and the filter acquiring unit 350 can acquire the Filter id, the Precedence order, and the Filter Content by using the session administration function.

The QoS rule generating unit 360 generates the same quality-of-service rule as the QoS rule generating unit 58 of the UE 50. Specifically, the QoS rule generating unit 360 generates the 5G QoS Rule associated with a particular QoS flow based on the EBI of the EPS bearer and the filter (TFT) acquired by the filter acquiring unit 350.

Because the association between the EPS bearer and the QoS flow can be identified based on the mapping informa-tion held in the mapping information holding unit 330, in the same manner as the QoS rule generating unit 58, the QoS rule generating unit 360 can generate the 5G QoS Rule for the QoS flow associated with the EPS bearer set by the UE 50.

Moreover, in the same manner as the QoS rule generating unit 58, the QoS rule generating unit 360 can generate the 5G QoS Rule when the handover of the UE 50 is performed.

The QoS rule generating unit 360 can generate the Rule id (rule identifier) for recognizing the 5G QoS Rule based on the EBI and the Filter id (filter identifier) for recognizing the filter (TFT).

(3) Operation of Radio Communication System

An operation of the radio communication system 10 is explained below. Specifically, an operation performed by the UE 50 when performing the inter-system handover between 4G and 5G in the radio communication system 10 is explained below.

Note that, an operation example is explained below in which the UE 50 performs the handover from 4G to 5G. (3.1) Outline of Operation When the UE 50 performs the inter-system procedure, such as a handover between the EPC and an idle mode (idle mode) or a connected mode (connected mode) of the 5GC, the mapping between the EPS bearer related to the PDN connection and the QoS flow related to the PDU session is necessary. The UE 50 can perform the inter-system han-dover of the UE 50 by using the EPS bearer and the PDU session.

In the present embodiment, the UE 50 holds the mapping information in which the EPS Bearer ID, for recognizing the type of the EPS bearer, and the QoS flow are mapped with each other. Specifically, the UE 50 holds the mapping information showing the association between the EPS Bearer ID and the QoS Flow ID. Therefore, each time the UE 50 performs the inter-system handover, it is not neces-sary to transmit to the UE 50 the mapping information, that is, the association between the EPS Bearer ID and the QoS Flow ID.

Figure 4:
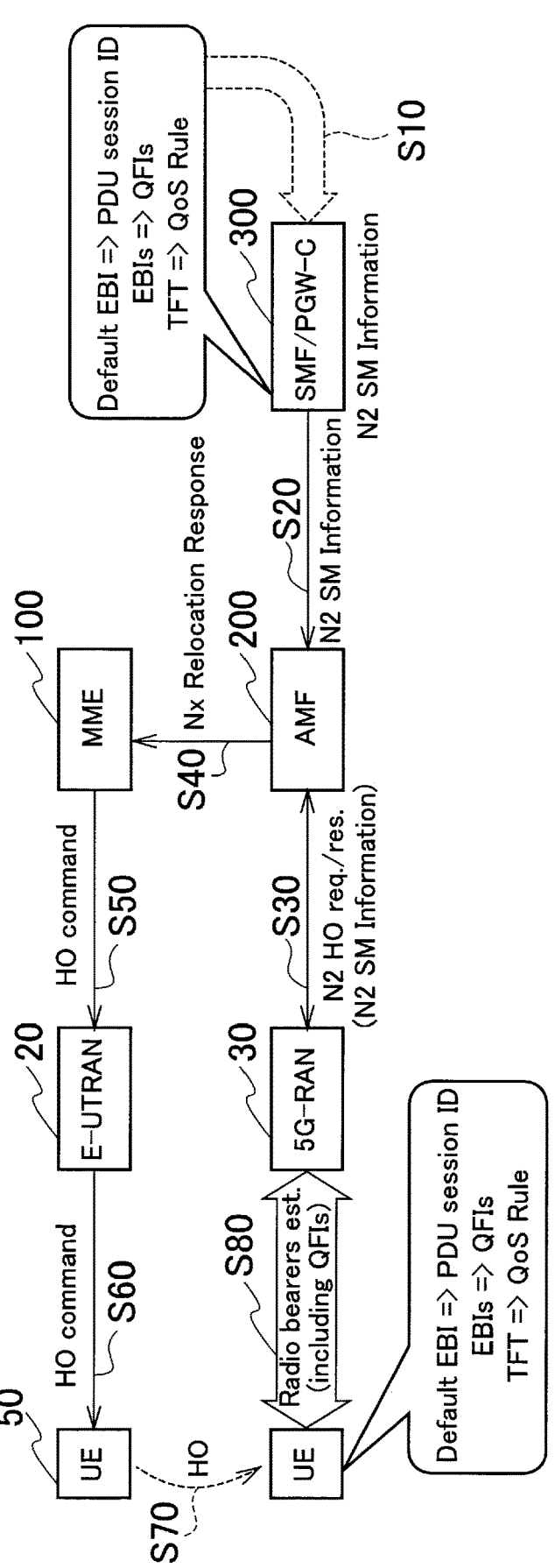
FIG. 4 is a view showing a conceptual sequence of an inter-system handover from 4G to 5G by the UE 50.

FIG. 4 shows a conceptual sequence of the inter-system handover from 4G to 5G by the UE 50. As shown in FIG. 4, the SMF/PGW-C 300 generates the mapping information based on an association rule prescribed beforehand between the EPS Bearer ID (EBI) and the QoS Flow ID (QFI) (Step S10). The SMF/PGW-C 300 can generate the mapping information beforehand regardless of a timing at which the inter-system handover of the UE 50 is performed.

The SMF/PGW-C 300 identifies, by using the mapping information, the QoS flow associated with the EPS bearer identified by the EBI. Furthermore, the SMF/PGW-C 300 generates the quality-of-service rule (5G QoS Rule) associ-ated with the QoS flow based on the filter (TFT) associated with the EPS bearer. Note that, a specific method for generating the 5G QoS Rule will be explained in detail later by referring to FIG. 6.

As shown in FIG. 4, the mapping information is consti-tuted by an association among a plurality of predetermined EBIs and a plurality of predetermined QFIs (Default EBI=>PDU session ID and EBIs=>QFIs in FIG. 4).

Such mapping information is supplied beforehand to the UE 50, and the same is held by the UE 50 also. When supplying the mapping information to the UE 50, as men-tioned earlier, various methods can be employed, such as using the notification information and pre-installing in UICC/USIM and the like.

In this manner, when the UE 50 performs the inter-system handover in a state in which the mapping information has been held in the UE 50 beforehand, the SMF/PGW-C 300 transmits N2 SM Information to the AMF 200 (Step S20).

Note that, the process procedure after Step S20 is similar to the existing sequence used to perform the inter-system handover from 4G to 5G.

The AMF 200 transmits and receives a handover request and reply (N2 HO req./res.) to and from the 5G RAN 30 based on the N2 SM Information received from the SMF/PGW-C 300 (Step S30). Moreover, the AMF 200 transmits to the MME 100 Nx Relocation Response representing that the UE 50 is transitioning from the 4G to the 5G (Step S40).

The MME 100 that received the Nx Relocation Response transmits HO command to the UE 50 via the E-UTRAN 20 (Steps S50 and S60).

The UE 50 performs the handover to the 5G RAN 30 based on the received HO command (Step S70). The UE 50, by using the mapping information held therein, determines the QFI associated with the EBI of the EPS bearer that is in the set state, that is, the EBI of the EPS bearer that is in an active state.

The UE 50 sets the radio bearer with the 5G RAN 30 by using the QoS flow associated with the determined QFI (Step S80).

Moreover, the UE 50 identifies, by using the mapping information, the QoS flow associated with the EPS bearer identified by the EBI. Furthermore, the UE 50 generates the quality-of-service rule (5G QoS Rule) associated with the QoS flow based on the filter (TFT) associated with the EPS bearer (in the same manner as the SMF/PGW-C 300 does at Step S10).

(3.2) Generation of QoS Rule

Figure 5:
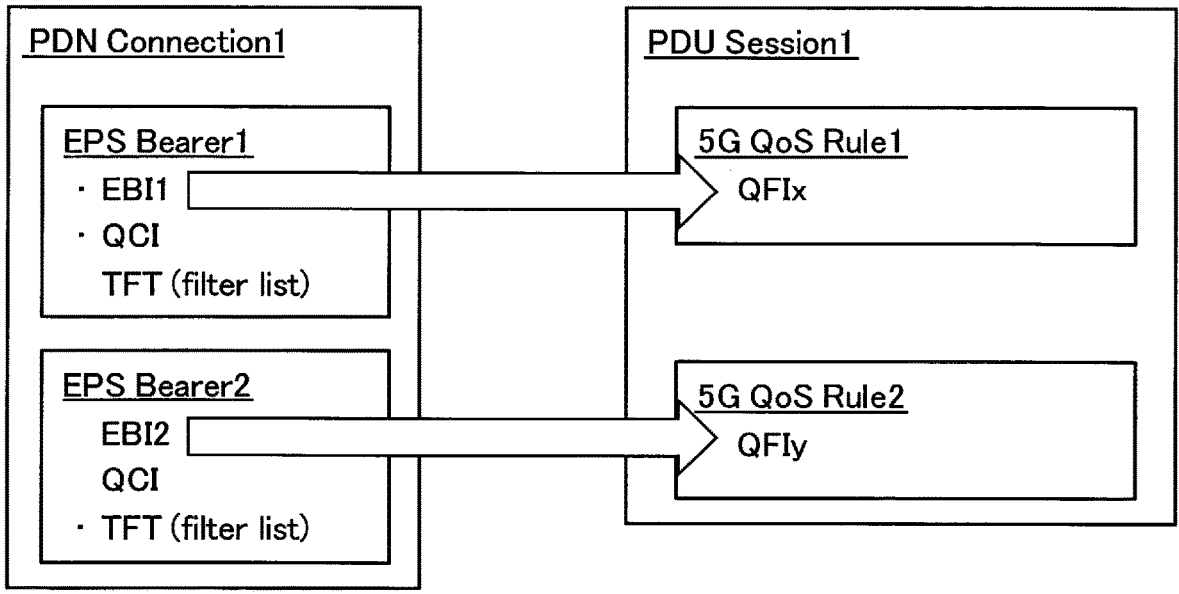
FIG. 5 is a view for explaining an operation to identify PDU session (QoS flow) associated with PDN connection (EPS bearer) by using mapping information.
Figure 6:
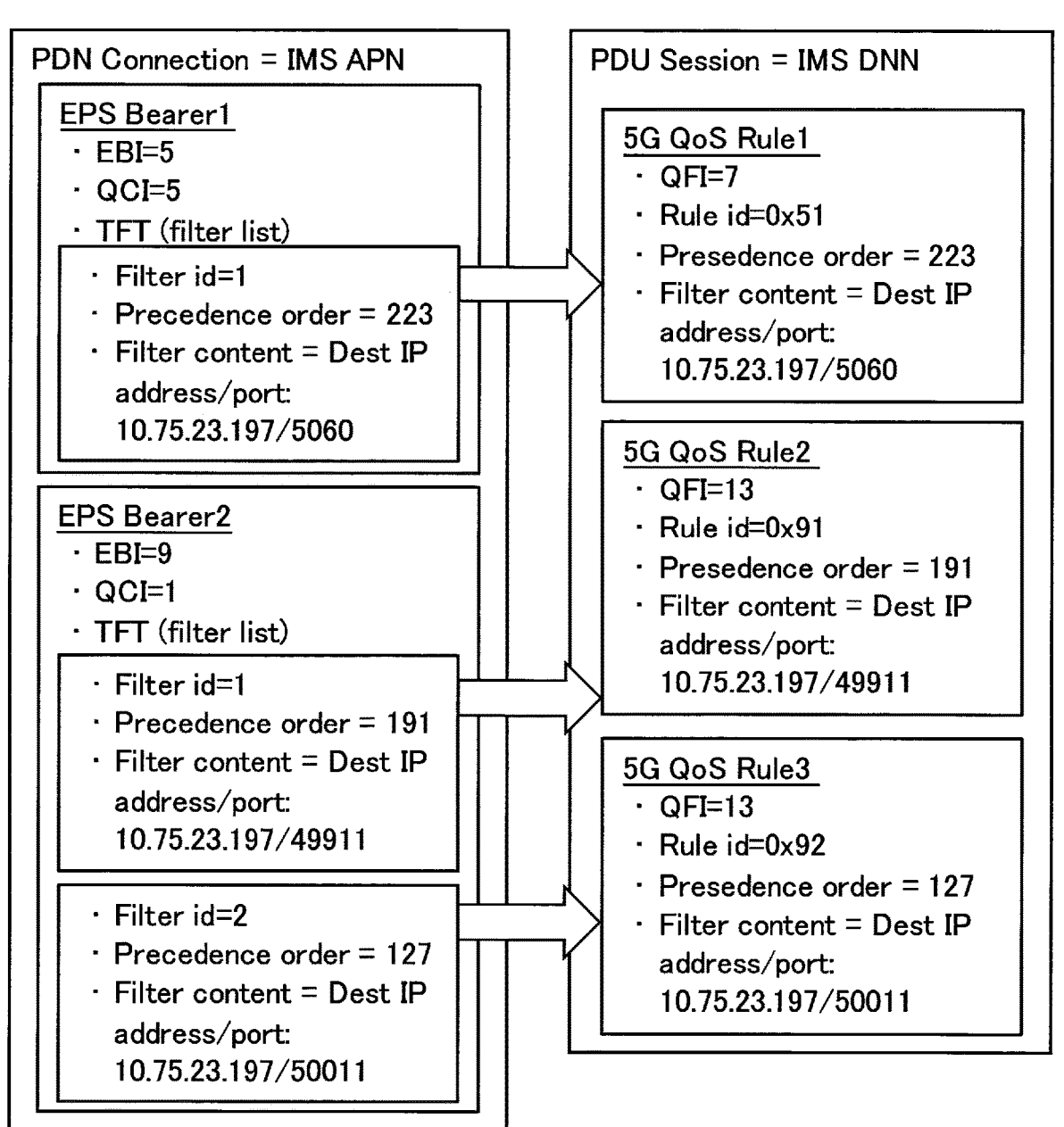
FIG. 6 is a view for explaining an operation to generate a quality-of-service rule (5G QoS Rule) associated with the identified QoS flow based on a filter (TFT) associated with the EPS bearer.

FIGS. 5 and 6 are views for explaining an operation up to generation of setting content of the PDU session (QoS flow) based on setting content of the PDN connection (EPS bearer).

Specifically, FIG. 5 is a view for explaining an operation for identifying, by using the mapping information, the PDU session (QoS flow) associated with the PDN connection (EPS bearer).

FIG. 6 is a view for explaining an operation for generating, based on the filter (TFT) associated with the EPS bearer, the quality-of-service rule (5G QoS Rule) associated with the identified QoS flow.

First of all, as shown in FIG. 5, the UE 50 (also the SMF/PGW-C 300, this holds true in the below explanation as well) identifies, based on the above-explained mapping information containing the association between the EPS Bearer ID and the QoS Flow ID, the QFI associated with EBI of the set EPS bearer.

For example, as shown in FIG. 5, the UE 50 identifies QFIx (EBI1=>QFIx) of the QoS flow (PDU session 1) associated with EBI1 of EPS bearer 1 (PDN connection 1). Similarly, the UE 50 performs identification of EBI2=>QFIy. Note that, in FIG. 5 (and FIG. 6), separately from the EBI and the QFI, formal numbers of the EPS bearer and the 5G QoS Rule (EPS bearer 1, 5G QoS Rule 1, and the like) have been shown for the sake of convenience.

As shown in FIG. 5, the setting information of the EPS bearer includes, other than the EBI, QoS Class Identifier (QCI), the TFT (filter list), and the like. Such TFT is widely used in the VoLTE and the like (e.g., QCI=1 for voice and QCI=2 for video).

When the UE 50 performs the handover from 4G (EPC) to 5G (5GC), it is necessary that each of the UE 50 and the 5GC (also SMF/PGW-C 300) recognizes a common 5G QoS Rule (that is, TFT) applied to the QoS flow that the UE 50 uses after the handover to 5GC is over. If such a common 5G QoS Rule is recognized by both the UE 50 and the 5GC, it is possible to add or delete the 5G QoS Rule.

Then, the UE 50 generates the 5G QoS Rule associated with the QoS flow identified based on the mapping information. Specifically, the UE 50 generates content of the 5G QoS Rule based on content of the TFT (filter list) associated with the EPS bearer. Precisely, the UE 50 derives the content of the 5G QoS Rule based on the content of the TFT. That is, between the UE 50 and the 5GC (also SMF/PGW-C 300 and the like), it is not necessary to exchange data and the like for synchronizing the content of the 5G QoS Rules.

Specifically, as shown in FIG. 6, the content of the TFT and the content of the 5G QoS Rule are associated one-to-one. Specifically, the Filter id of the TFT and the Rule id of the 5G QoS Rule are associated one-to-one.

For example, the content of the TFT of EBI=5 is associated with the 5G QoS Rule of QFI=7. Note that, it is assumed that the association EBI5=>QFI7 is identified based on the mapping information.

Moreover, the Precedence order and the Filter Content of the TFT are copied as the content of the 5G QoS Rule.

In the example shown in FIG. 6, the EPS bearer 1 is a default EPS bearer (QCI=5) and it is meant for SIP (Session Initiation Protocol) traffic. The TFT (Filter id=1) of the EPS bearer 1 is a filter (TCP/UDP port 5060) for the SIP, and the traffic other than the SIP traffic is blocked (the EPS bearer cannot be used).

EPS bearer 2 is the EPS bearer (QCI=1) for exclusive use for voice media. The TFT (Filter id=1) of the EPS bearer 2 is a filter for RTP traffic (voice media). The TFT (Filter id=2) of the EPS bearer 2 is a filter for RTCP traffic (control for voice RTP). The content of the TFT (Filter id=1, 2) of the EPS bearer 2 is also associated with a particular 5G QoS Rule, the 5G QoS Rule of QFI=13 in the example shown in FIG. 6. Because each of the TFTs (Filter id=1, 2) is associated with the EPS bearer 2 (EBI=9), the content of those TFTs is generated as the 5G QoS Rule 2, 3 associated with the same QFI (QFI=13).

In the EPS bearer 2, the Precedence order of the TFT of Filter id=1 is 191, and the Precedence order of the TFT of Filter id=2 is 127. Smaller the value is, higher the priority is. The TFT of Filter id=2 is, as mentioned earlier, for the RTCP traffic, and, among the TFTs shown in FIG. 6, has the highest priority. Moreover, the TFT of Filter id=1 is for the RTP traffic (voice media), and to give weight to real-timeness, the priority (191) thereof is set to a little higher than the Precedence order (223) of the TFT for the SIP.

The Rule id is generated automatically based on a rule that uses the value of the EBI. Specifically, by expressing a value (4 bits) of the EBI with the upper four bits of the Rule id and expressing a value of the Filter id with the lower four bits of the Rule id, the Rule id is configured so as to be able to be identified uniquely between PDU sessions.

For example, as shown in FIG. 6, because the Rule id (8 bits integer number) of the 5G QoS Rule 1 is associated with EBI=5 and Filter id=1, the Rule id of the 5G QoS Rule 1 becomes 0x51.

(3.3) Handover

A specific sequence of the inter-system handover from 4G to 5G performed by the UE 50 is explained below.

In this operation example, a sequence of the inter-system handover when the state of the UE 50 in the 5GC is the connected mode (connected mode) is explained.

Figure 7:
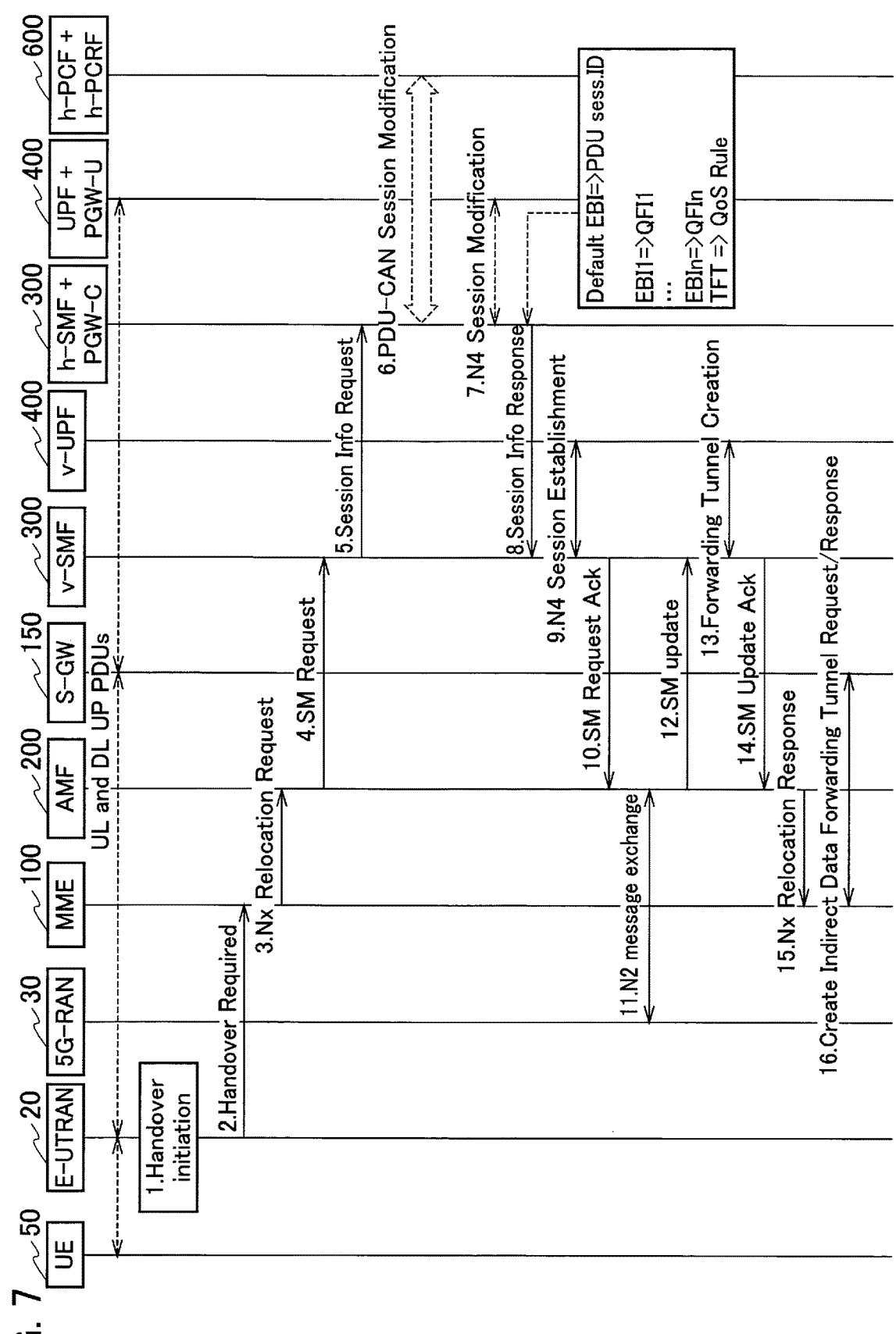
FIG. 7 is a view showing a sequence example in a handover preparation phase.
Figure 8:
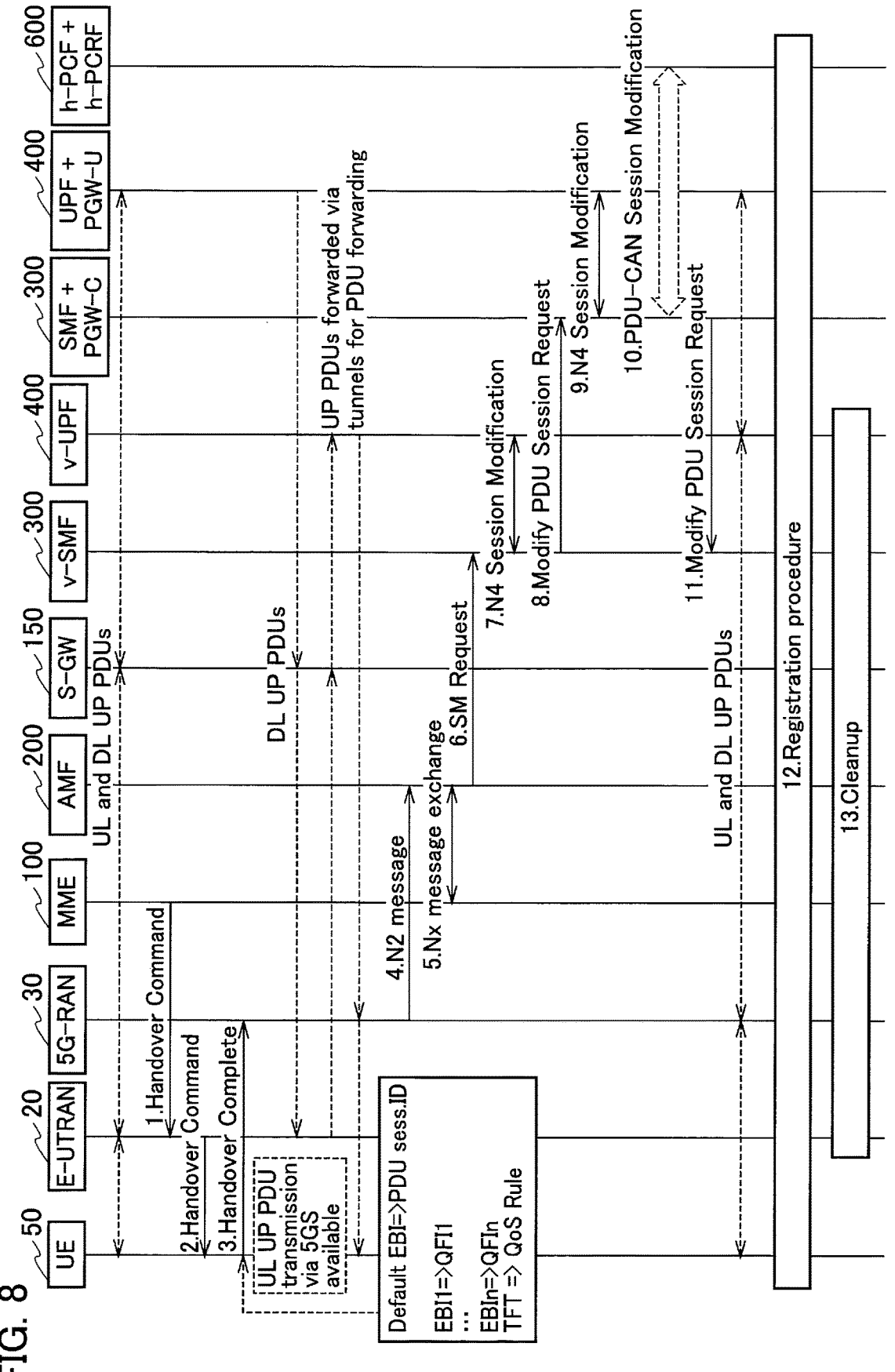
FIG. 8 is a view showing a sequence example in a handover execution phase.

FIG. 7 shows an example of a sequence in a handover preparation phase. FIG. 8 shows an example of a sequence in a handover execution phase.

Note that, the examples of the sequences shown in FIGS. 7 and 8 are shown in 3GPP TS 23.502 Section 4.11 (System interworking procedures with EPS), and the like. Particularly, the examples of the sequences shown in FIGS. 7 and 8 are shown in the document related to 3GPP ("TS 23.502: P-CR for Single Registration-based Interworking from EPS to 5GS procedure" S2-171013, SA WG2 Meeting #119, 3GPP, February 2017). The content that is different from the above document is mainly explained below.

As shown in FIG. 7, in the handover preparation phase, the SMF/PGW-C 300 generates the ID of the PDU session and assigns a predetermined QoS flow (Step 8 of FIG. 7). When doing so, the SMF/PGW-C 300 uses the mapping information generated beforehand.

The SMF/PGW-C 300 identifies, by using the mapping information, the QoS flow associated with the EPS bearer identified based on the EBI. Furthermore, the SMF/PGW-C 300 generates, based on the filter (TFT) associated with the EPS bearer, the quality-of-service rule (5G QoS Rule) associated with the QoS flow.

As mentioned earlier, substantially, the ID of the PDU session is associated with the default EBI of the PDN connection. Moreover, the QFI is associated with one of the EBIs.

As shown in FIG. 8, in the handover execution phase, the UE 50 performs association between the EBI and the QFI by using the mapping information that is the same as the mapping information used by the SMF/PGW-C 300 (Step 3 shown in FIG. 8).

Moreover, the UE 50 identifies the QoS flow associated with the EPS bearer identified by the EBI by using the mapping information. Furthermore, the UE 50 generates, based on the filter (TFT) associated with the EPS bearer, the quality-of-service rule (5G QoS Rule) associated with the QoS flow.

In this manner, in the present operation example, because the mapping information held beforehand is used, transmission and reception of the mapping information is not performed in the handover preparation phase (specifically, at Step 15) and in the handover execution phase (specifically, at Steps 1 and 2).

Moreover, as mentioned earlier, the mapping information held by the UE 50 and the SMF/PGW-C 300 can be updated, so that an OAM (Operation, Administration, Management) system of the network (EPC, 5GC) side can supply the updated mapping information to a node of the UE 50, the SMF/PGW-C 300, and the like.

(3.4) Setting of QoS Rule and Traffic Flow Template Accompanied with Handover

Setting of the QoS rule and the traffic flow template (TFT), when the UE 50 performs the handover from 4G to 5G and thereafter performs the handover to 4G again, is explained below.

FIG. 9 is a view for explaining the setting of the QoS rule and the TFT when the UE 50 performs 4G-5G-4G handover.

As shown in FIG. 9, when the UE 50 performs transition (handover) from 4G to 5G, as mentioned earlier, the UE 50 and the 5GC (SMF/PGW-C 300) autonomously generate the 5G QoS Rule, that is, derive the 5G QoS Rule based on the TFT of the EPS bearer.

Then, during a period in which the UE 50 is communicating (including waiting) via the 5G, when a requirement arises in the 5GC to change the 5G QoS Rule, even the content of the TFT of the EPS bearer associated with the 5G QoS Rule that is the target to be changed is changed, and the UE 50 is notified of the changed content.

Moreover, when the 5GC sets a new QoS flow (QFI), the 5GC notifies the UE 50 of the content (entire content) of the TFT of the EPS bearer associated with the 5G QoS Rule of the new QoS flow. Note that, such notification can be implemented by PDU Session Modification procedure (e.g., "23.502: QoS mapping for 5GC-EPC interworking", S2-173339, 3GPP TSG SA WG2 Meeting #121, 3GPP, May 2017).

Moreover, for the time being, assuming that addition or correction of the service occurs when the UE 50 transitions to the 5G, requiring addition of the 5G QoS Rule or changing the content of the QoS flow, because the 5G QoS Rule is a superset of the TFT, it is necessary to update the entire content of the associated TFT. Therefore, in such a case, it is necessary to start and perform the normal PDU Session Modification procedure on the NW side.

When the UE 50 performs the transition (handover) back to 4G from 5G, because the UE 50 is already holding the TFT of the EPS bearer associated with the 5G QoS Rule being used, the UE 50 uses this TFT and continues communication via the EPS bearer.

(4) Effects and Advantages

According to the present embodiment, the following effects and advantages can be obtained. Specifically, the UE 50 (and SMF/PGW-C 300) can generate, precisely, derive, based on the EBI and the filter (TFT) of the EPS bearer, the 5G QoS Rule associated with the QoS flow identified based on the mapping information.

Therefore, like in the VoLTE, even when the EPS bearer is associated with a particular TFT, the content of the TFT can be autonomously reflected in the 5G QoS Rule associated with the QoS flow of the handover destination. That is, according to the radio communication system 10, even when the EPS bearer is associated with a particular TFT, a flexible inter-system handover (from 4G to 5G and from 5G to 4G) of the UE 50 can be implemented while maintaining a desired quality of the service.

Moreover, because there is no need to perform a communication between the UE 50 and the 5GC for generating the 5G QoS Rule, reduction in the processing load, saving of the radio resource, and quicker handover can be achieved.

In the present embodiment, the 5G QoS Rule can be generated at the time of performing the handover of the UE 50 from 4G to 5G. Therefore, a new 5G QoS Rule can be generated depending on the need of the 5G QoS Rule.

In the present embodiment, the Rule id having a regularity can be generated automatically based on the EBI and the Filter id. Therefore, even when the UE 50 and the 5GC (SMF/PGW-C 300) independently generate respective 5G QoS Rules, the same Rule id can be allocated, and the same 5G QoS Rule can be surely recognized in the UE 50 and the 5GC.

(5) Other Embodiments

Although the contents of the present invention have been explained above by using the embodiments, it is obvious for a person skilled in the art that the present invention is not limited to those embodiments and that various modifications and improvements thereof are possible.

For example, in the above embodiments, the SMF/PGW-C 300 generated and held the mapping information and the quality-of-service rule (5G QoS Rule). Alternatively, the mapping information and the quality-of-service rule can be generated or held or both by other nodes (e.g., AMF 200) that constitute the 5GC or other nodes (e.g., MME 100) that constitute the EPC.

Moreover, the use of the above method of generating the 5G QoS Rule is not limited to when performing the handover of the UE 50. For example, the above method of generating the 5G QoS Rule can be used, when the content of the TFT is updated and the like, to notify this fact to the related node (UE 50, MME 100, SGW 150, SMF/PGW-C 300, and the like) by Protocol Configuration Options (PCO) prescribed in 3GPP 24.008.

Moreover, the block diagrams used for explaining the embodiments (FIGS. 2 and 3) show functional blocks. Those functional blocks (structural components) can be realized by a desired combination of hardware and/or software. Means for realizing each functional block is not particularly limited. That is, each functional block may be realized by one device combined physically and/or logically. Alternatively, two or more devices separated physically and/or logically may be directly and/or indirectly connected (for example, wired and/or wireless) to each other, and each functional block may be realized by these plural devices.

Figure 10:
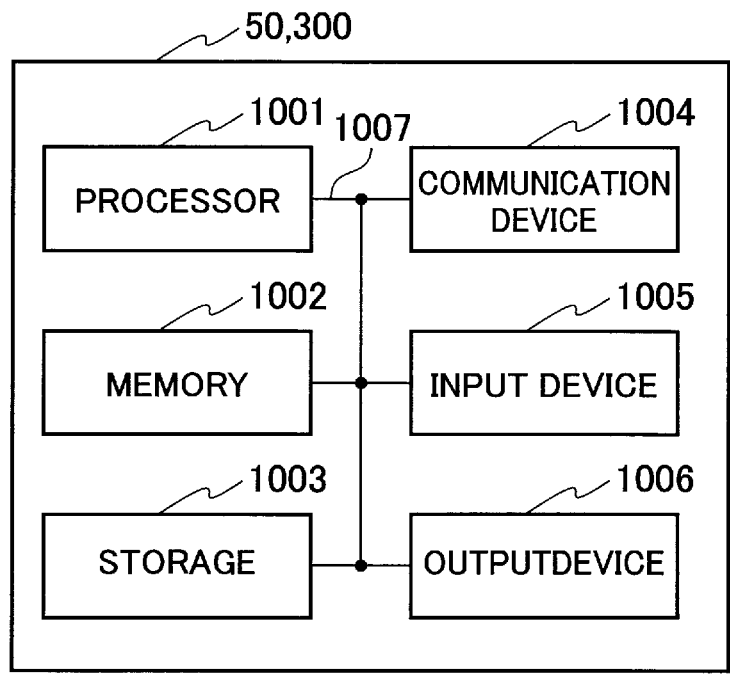
FIG. 10 is a view showing an example of a hardware configuration of the UE 50 and the SMF/PGW-C 300.

Furthermore, the UE 50, and the SMF/PGW-C 300 (devices) explained above can function as a computer that performs the processing of the present invention. FIG. 10 is a diagram showing an example of a hardware configuration of the devices. As shown in FIG. 10, each of the devices can be configured as a computer device including a processor 1001, a memory 1002, a storage 1003, a communication device 1004, an input device 1005, an output device 1006, and a bus 1007.

The functional blocks of the devices (see FIGS. 2 and 3) can be realized by any of hardware elements of the computer device or a desired combination of the hardware elements.

The processor 1001, for example, operates an operating system to control the entire computer. The processor 1001 can be configured with a central processing unit (CPU) including an interface with a peripheral device, a control device, a computing device, a register, and the like.

The memory 1002 is a computer readable recording medium and is configured, for example, with at least one of ROM (Read Only Memory), EPROM (Erasable Programmable ROM), EEPROM (Electrically Erasable Programmable ROM), RAM (Random Access Memory), and the like. The memory 1002 can be called register, cache, main memory (main memory), and the like. The memory 1002 can store therein a computer program (computer program codes) software modules, and the like that can execute the method according to the above embodiments.

The storage 1003 is a computer readable recording medium. Examples of the storage 1003 include an optical disk such as CD-ROM (Compact Disc ROM), a hard disk drive, a flexible disk, a magneto-optical disk (for example, a compact disk, a digital versatile disk, a Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information there among. The bus 1007 can be constituted by a single bus or can be constituted by separate buses between the devices.

In addition, the manner of notification of information is not limited to the one explained in the embodiments, and the notification may be performed in other manner. For example, the notification of information can be performed by physical layer signaling (for example, DCI (Downlink Control Information), UCI (Uplink Control Information)), upper layer signaling (for example, RRC signaling, MAC (Medium Access Control) signaling, notification information (MIB (Master Information Block), SIB (System Information Block)), other signals, or a combination thereof. In addition, the RRC signaling can be called an RRC message, and the RRC signaling can be, for example, an RRC Connection Setup message, an RRC Connection Reconfiguration message, and the like.

Furthermore, the input/output information can be stored in a specific location (for example, a memory) or can be managed in a management table. The information to be input/output can be overwritten, updated, or added. The information can be deleted after outputting. The inputted information can be transmitted to another device.

The order of the sequences, flowcharts, and the like in the embodiments can be rearranged unless there is a contradiction.

Moreover, in the embodiments explained above, the specific operations performed by the SMF/PGW-C 300 can be performed by another network node (device). Moreover, functions of the SMF/PGW-C 300 can be provided by combining a plurality of other network nodes.

Moreover, the terms used in this specification and/or the terms necessary for understanding the present specification can be replaced with terms having the same or similar meanings. For example, a channel and/or a symbol can be replaced with a signal (signal) if that is stated. Also, the signal can be replaced with a message. Moreover, the terms "system" and "network" can be used interchangeably.

Furthermore, the used parameter and the like can be represented by an absolute value, can be expressed as a relative value from a predetermined value, or can be represented by corresponding other information. For example, the radio resource can be indicated by an index.

The radio base stations 25 and 35 (base station) can accommodate one or more (for example, three) cells (also called sectors). In a configuration in which the base station accommodates a plurality of cells, the entire coverage area of the base station can be divided into a plurality of smaller areas. In each such a smaller area, communication service can be provided by abase station subsystem (for example, a small base station for indoor use RRH: Remote Radio Head).

The term "cell" or "sector" refers to a part or all of the coverage area of a base station and/or a base station subsystem that performs communication service in this coverage. In addition, the terms "base station" "eNB", "cell", and "sector" can be used interchangeably in the present specification. The base station can also be referred to as a fixed station, Node B, eNode B (eNB), gNode B (gNB), an access point, a femtocell, a small cell, and the like.

The UE 50 is called by the persons skilled in the art as a subscriber station, a mobile unit, a subscriber unit, a radio unit, a remote unit, a mobile device, a radio device, a radio
communication device, a remote device, a mobile subscriber
station, an access terminal, a mobile terminal, a radio
terminal, a remote terminal, a handset, a user agent, a mobile
client, a client, or with some other suitable term.

As used herein, the phrase "based on" does not mean
"based only on" unless explicitly stated otherwise. In other
words, the phrase "based on" means both "based only on"
and "based at least on".

Furthermore, the terms "including", "comprising", and
variants thereof are intended to be inclusive in a manner
similar to "having". Furthermore, the term "or" used in the
specification or claims is intended not to be an exclusive
disjunction.

Any reference to an element using a designation such as
"first", "second", and the like used in the present specifica-
tion generally does not limit the amount or order of those
elements. Such designations can be used in the present
specification as a convenient way to distinguish between two
or more elements. Thus, the reference to the first and second
elements does not imply that only two elements can be
adopted, or that the first element must precede the second
element in some or the other manner.

Throughout the present specification, for example, during
translation, if articles such as a, an, and the in English are
added, these articles shall include plurality, unless it is
clearly indicated that it is not so according to the context.

As described above, the details of the present invention
have been disclosed by using the embodiments of the
present invention. However, the description and drawings
which constitute part of this disclosure should not be inter-
preted so as to limit the present invention. From this
disclosure, various alternative embodiments, examples, and
operation techniques will be apparent to a person skilled in
the art.

INDUSTRIAL APPLICABILITY

The radio communication system, and the radio commu-
nication method explained above are useful in that the
content of the TFT can be autonomously reflected in the QoS
rule associated with the QoS flow of the handover destina-
tion even when the particular traffic flow template (TFT) is
associated with the EPS bearer.

EXPLANATION OF REFERENCE NUMERALS 10 radio communication system
20 E-UTRAN
25 radio base station
30 5G RAN
35 radio base station
40 DN
50 UE
51 radio communication unit
53 connection setting unit
55 session setting unit
56 mapping information holding unit
57 filter holding unit
58 QoS rule generating unit
59 handover executing unit
100 MME
150 SGW
200 AMF 300 SMF/PGW-C
310 connection controlling unit
320 session controlling unit
330 mapping information holding unit
340 mapping information managing unit
350 filter acquiring unit
360 QoS rule generating unit
400 UPF/PGW-U
500 UDM
600 PCF/PCRF
1001 processor
1002 memory
1003 storage
1004 communication device
1005 input device
1006 output device
1007 bus

The invention claimed is:
1. A user device comprising:
a memory that holds association information indicating an
association between an Evolved Packet System (EPS)
bearer that is set in a first radio communication system
according to 4G and a Quality of Service (QoS) flow
that is set in a second radio communication system
according to 5G, the memory that holds a traffic flow
template associated with the EPS bearer; and
a processor that performs handover from the first radio
communication system to the second radio communi-
cation system,
wherein the processor derives, based on the association
information and the traffic flow template, a quality-of-
service rule of the QoS flow associated with the traffic
flow template when performing the handover,
wherein the traffic flow template comprises one or more
filter identifiers, precedence, and filter content, and
wherein, when a new QoS flow is mapped to an EPS
bearer identifier already assigned to an existing QoS
flow, the processor recognizes the bearer identifier
contained in QoS flow ID description received during
handover and links both QoS flows to that same bearer.
2. A radio communication method implemented in a user
device comprising:
holding association information indicating an association
between an Evolved Packet System (EPS) bearer that is
set in a first radio communication system according to
4G and a Quality of Service (QoS) flow that is set in a
second radio communication system according to 5G;
holding a traffic flow template associated with the EPS
bearer;
performing handover from the first radio communication
system to the second radio communication system; and
deriving, based on the association information and the
traffic flow template, a quality-of-service rule of the
QoS flow associated with the traffic flow template when
performing the handover,
wherein the traffic flow template comprises one or more
filter identifiers, precedence, and filter content, and
wherein, when a new QoS flow is mapped to an EPS
bearer identifier already assigned to an existing QoS
flow, the user device recognizes the bearer identifier
contained in QoS flow ID description received during
handover and links both QoS flows to that same bearer.

* * * * *